United States Patent
Braun et al.

(10) Patent No.: US 9,571,273 B2
(45) Date of Patent: Feb. 14, 2017

(54) METHOD AND SYSTEM FOR THE ACCELERATED DECRYPTION OF CRYPTOGRAPHICALLY PROTECTED USER DATA UNITS

(75) Inventors: Michael Braun, München (DE); Markus Dichtl, München (DE); Bernd Meyer, München (DE)

(73) Assignee: Siemens Aktiengesellschaft, Munich (DE)

( * ) Notice: Subject to any disclaimer, the term of this patent is extended or adjusted under 35 U.S.C. 154(b) by 733 days.

(21) Appl. No.: 13/508,707

(22) PCT Filed: Oct. 12, 2010

(86) PCT No.: PCT/EP2010/065266
§ 371 (c)(1),
(2), (4) Date: Sep. 4, 2012

(87) PCT Pub. No.: WO2011/054630
PCT Pub. Date: May 12, 2011

(65) Prior Publication Data
US 2012/0321088 A1 Dec. 20, 2012

(30) Foreign Application Priority Data

Nov. 9, 2009 (DE) .......................... 10 2009 052 456

(51) Int. Cl.
*H04L 29/06* (2006.01)
*H04L 9/08* (2006.01)

(52) U.S. Cl.
CPC .................................. *H04L 9/0825* (2013.01)

(58) Field of Classification Search
CPC ........ H04L 9/0825; H04L 9/0822; H04L 9/08; H04L 9/0838; H04L 9/16; H04L 63/06; H04L 63/10; H04L 67/22; H04L 67/24; H04L 67/141; H04L 67/303; G06F 21/10; G06F 21/105; G06F 21/121
(Continued)

(56) References Cited

U.S. PATENT DOCUMENTS 5,265,164 A * 11/1993 Matyas ............... G06F 9/30003
380/2
6,178,244 B1 * 1/2001 Takeda .................. H04L 9/0822
380/259

(Continued)

FOREIGN PATENT DOCUMENTS

CN 101479984 A 7/2009
DE 10038779 3/2002

(Continued)

OTHER PUBLICATIONS

Applied Micro Circuits Corporation, 'Power Architecture Products Products selector Guide', 2010, Applied Micro Circuits Corporation, 405EX processor Specifications, http://datasheet.octopart.com/PPC405EXR-NSD333T-AMCC-datasheet-11601295.pdf.*

(Continued)

*Primary Examiner* — Luu Pham
*Assistant Examiner* — Ronald Baum
(74) *Attorney, Agent, or Firm* — Cozen O'Connor

(57) ABSTRACT

A method and system for accelerated decryption of a cryptographically protected user data unit, wherein a transmitter initially generates a cryptographic key that is provided with a related key identification. The transmitter then performs asymmetrical encryption of the generated cryptographic key using a public cryptographic key and encryption of at least one user data unit using the generated cryptographic key. The encrypted user data unit, the asymmetrically encrypted cryptographic key and the related key identification of the cryptographic key are transported to a receiver that decrypts (Continued)

the received asymmetrically encrypted key using a private key, if verification of the received related key identification of the cryptographic key indicates the cryptographic key is not present in a decrypted state in the receiver. The receiver then decrypts the received cryptographically encrypted user data unit using the cryptographic key in the receiver or with the cryptographic key decrypted using the private key.

16 Claims, 2 Drawing Sheets

(58) Field of Classification Search
    USPC .......................................................... 380/282
    See application file for complete search history.

(56) References Cited

U.S. PATENT DOCUMENTS

| | | | |
|---|---|---|---|
| 6,704,871 B1* | 3/2004 | Kaplan et al. ................. | 713/192 |
| 6,779,111 B1* | 8/2004 | Gehrmann et al. ........... | 713/171 |
| 6,918,038 B1 | 7/2005 | Smith et al. | |
| 7,630,498 B2* | 12/2009 | Noh ............................... | 380/281 |
| 8,015,393 B2* | 9/2011 | Fukasawa ........................ | 713/1 |
| 8,054,978 B2* | 11/2011 | Itkis .............................. | 380/286 |
| 8,396,208 B2* | 3/2013 | Holtzman ............... | H04L 9/065 |
| | | | 380/277 |
| 8,509,448 B2* | 8/2013 | Thomas et al. ............... | 380/282 |
| 8,594,335 B1* | 11/2013 | Izhar et al. ................... | 380/279 |
| 2002/0129240 A1 | 9/2002 | Sussmann | |
| 2002/0136407 A1* | 9/2002 | Denning et al. .............. | 380/258 |
| 2002/0183985 A1* | 12/2002 | Hori ........................ | G06F 21/10 |
| | | | 703/1 |
| 2003/0182566 A1* | 9/2003 | Kohara ................. | H04L 9/0894 |
| | | | 713/193 |
| 2004/0005061 A1* | 1/2004 | Buer et al. .................... | 380/282 |
| 2004/0039925 A1* | 2/2004 | McMillan ................ | H04L 63/06 |
| | | | 713/189 |
| 2004/0151318 A1* | 8/2004 | Duncanson, Jr. ..... | H04L 63/062 |
| | | | 380/277 |
| 2004/0205248 A1* | 10/2004 | Little .................. | H04L 63/0428 |
| | | | 709/246 |
| 2004/0223618 A1* | 11/2004 | Dellow ................. | H04L 9/0631 |
| | | | 380/277 |
| 2005/0125683 A1* | 6/2005 | Matsuyama ............ | G06F 21/33 |
| | | | 713/189 |
| 2005/0195975 A1* | 9/2005 | Kawakita .............. | H04L 9/0822 |
| | | | 380/30 |
| 2006/0212706 A1 | 9/2006 | Jiang et al. | |
| 2007/0098149 A1* | 5/2007 | Coenen ........................... | 380/2 |
| 2007/0201693 A1* | 8/2007 | Ohno ................... | H04N 7/1675 |
| | | | 380/201 |
| 2008/0063209 A1* | 3/2008 | Jaquette et al. ............... | 380/284 |
| 2008/0165973 A1* | 7/2008 | Miranda Gavillan | |
| | | et al. ............................ | 380/278 |
| 2008/0256646 A1 | 10/2008 | Strom et al. | |
| 2009/0106551 A1 | 4/2009 | Boren et al. | |
| 2009/0116643 A1* | 5/2009 | Hatano et al. ................. | 380/59 |
| 2009/0138700 A1* | 5/2009 | Miyazaki .............. | H04L 9/0894 |
| | | | 713/150 |
| 2009/0204958 A1 | 8/2009 | Kornmeier | |
| 2009/0208017 A1* | 8/2009 | Almoustafa ............ | H04L 9/083 |
| | | | 380/277 |
| 2010/0031021 A1* | 2/2010 | Arnold et al. ................ | 713/155 |
| 2010/0254537 A1* | 10/2010 | Buer et al. .................... | 380/279 |
| 2013/0212707 A1* | 8/2013 | Donahue et al. ............... | 726/29 |

FOREIGN PATENT DOCUMENTS

| | | |
|---|---|---|
| DE | 10059230 | 6/2002 |
| DE | 102004055814 | 5/2006 |
| WO | WO 2007121587 | 11/2007 |

OTHER PUBLICATIONS

Shi, W., et al, 'Accelerating Memory Decryption and Authentication with Frequent Value Prediction', 2007 ACM 978-1-59593683-7/07/0005, Motorola, Inc., entire document, http://citeseerx.ist.psu.edu/viewdoc/download?doi=10.1.1.89.5443&rep=rep1&type=pdf.*

* cited by examiner

METHOD AND SYSTEM FOR THE ACCELERATED DECRYPTION OF CRYPTOGRAPHICALLY PROTECTED USER DATA UNITS

CROSS-REFERENCE TO RELATED APPLICATIONS

This is a U.S. national stage of application No. PCT/EP2010/065266 filed 12 Oct. 2010. Priority is claimed on German Application No. 10 2009 052 456.8 filed 9 Nov. 2009, the content of which is incorporated herein by reference in its entirety.

BACKGROUND OF THE INVENTION

1. Field of the Invention

The invention relates to data encryption and, more particularly, to a method and system for accelerated decryption of cryptographically protected user data units, and more particularly for the accelerated decryption of hybrid encrypted data.

2. Description of the Related Art

When transporting data from a transmitter to a receiver over a transmission channel, these data are in many cases transmitted in encrypted form to prevent unauthorized third party access to the data. Various encryption methods are known, in particular asymmetrical and symmetrical encryption methods. In a conventional hybrid encryption method, an asymmetrical encryption is combined with a symmetrical encryption. In this case, a generated session key is firstly asymmetrically encrypted using an asymmetrical encryption method, and buffered. Using a symmetrical encryption method, the user data that is actually to be transmitted is then encrypted using the generated unencrypted session key and following buffering is transported over the transmission channel to a receiver. Decryption occurs accordingly on the part of the receiver. The use of a hybrid encryption method means that, firstly, the user data are encrypted using an asymmetrical encryption method, where this allows asymmetrical key management, and, secondly, the high performance and the low demands on the computing power for encryption and decryption of the user data, due to the symmetrical encryption method used, are utilized. The asymmetrical key management uses key pairs which consist of a public key for encryption and a private key for decryption. Owing to the asymmetrical key management the public key, which is used in the asymmetrical encryption method, does not need to be kept secret. The use of the symmetrical encryption and decryption method for the user data leads to increased data rates in comparison to asymmetrical encryption methods with a comparable security level of the key lengths used.

In conventional hybrid encryption methods, the public key portion of the hybrid encryption method represents a performance bottleneck in many practical applications. This applies in particular in the case of software implementations of cryptographic methods, such as in the case of embedded systems, microcontrollers and smart cards. For this reason in conventional systems, which use hybrid encryption methods, special hardware, such as long-number arithmetic logic units, crypto processors or hardware multipliers, is used in many cases to accelerate the public key calculations or asymmetrical encryption and decryption. The public key operations or calculation steps performed during the course of asymmetrical encryption and decryption are complex and require high computing power and are time consuming.

SUMMARY OF THE INVENTION

It is therefore an object of the present invention to provide a method that accelerates a hybrid encryption method without the demands on the computing power or the complexity of the circuits used in the process being appreciably increased.

This and other objects and advantages are achieved in accordance with the invention by a method for the accelerated decryption of cryptographically protected user data units, comprising the following steps:

(a) decryption of a received asymmetrically encrypted key (ENC-$K_{OEM}$) by a receiver with a private key ($K_{PRIV}$) if verification of the received related key identification ($K_{OEM}$-ID) of the cryptographic key ($K_{OEM}$) shows that the cryptographic key ($K_{OEM}$) is not yet present in a decrypted state in the receiver; and (b) decryption of a received cryptographically encrypted user data unit (ENC-NDE) using the cryptographic key ($K_{OEM}$) present in the receiver or using the cryptographic key ($K_{OEM}$) decrypted with the private key ($K_{PRIV}$), if the cryptographic key ($K_{OEM}$) is not present in the receiver.

In an embodiment of the method, if verification of the received key identification shows that the related cryptographic key is not yet present in the receiver, the cryptographic key decrypted using the private key is stored in the receiver together with its related key identification.

In another embodiment of the method, the user data units comprise a software component belonging to a software component manufacturer OEM.

In another possible embodiment, the cryptographic key $K_{OEM}$ comprises a session key belonging to the software component manufacturer.

In a further embodiment, the key identification comprises a hash value or test value of the respective cryptographic key.

In a still further embodiment of the method, the key identification comprises a generated random number of a random number generator of the transmitter.

In an alternative embodiment of the method, the key identification comprises a generated count value of a counter of the transmitter.

In another embodiment of the method, the encrypted user data unit, the related asymmetrically encrypted cryptographic key and its key identification are transported from the transmitter to the receiver over a network or stored on a data carrier.

In an embodiment of the method, the transmitter comprises a development system belonging to a software component manufacturer for the development of software components.

In another possible embodiment, the receiver comprises a target system device belonging to a user for the execution of software components.

In another embodiment of the method, the receiver comprises a memory-programmable controller.

It is also an object of the invention to provide a system for the accelerated decryption of cryptographically protected user data units comprising:

(a) a transmitter which comprises a first encryption unit for the asymmetrical encryption of a cryptographic key ($K_{OEM}$) using a public key ($K_{PUB}$), a second encryption unit for encrypting at least one user data unit (NDE) using the cryptographic key ($K_{OEM}$), and an interface for providing, i.e., making available the encrypted user data unit (ENC-NDE), the asymmetrically encrypted key (ENC-$K_{OEM}$) and a related key identification ($K_{OEM}$-ID) of the cryptographic key ($K_{OEM}$), (b) a transportation device for transporting the encrypted user data unit (ENC-NDE), the asymmetrically encrypted key (ENC-$K_{OEM}$) and the related key identification ($K_{OEM}$-ID) of the cryptographic key ($K_{OEM}$).

The system further comprises (c) a receiver which comprises a testing unit for, with the aid of the received key identification ($K_{OEM}$-ID), verifying whether the transported asymmetrically encrypted key (ENC-$K_{OEM}$) is already present in an encrypted form in the receiver, a first decryption unit for decrypting the received asymmetrically encrypted key (ENC-$K_{OEM}$) using a private key ($K_{PRIV}$), if the verification of the related key identification ($K_{OEM}$-ID) of the cryptographic key ($K_{OEM}$) shows that the received encrypted cryptographic key ($K_{OEM}$) is not yet present in a decrypted form in the receiver, and a second decryption unit that decrypts the received cryptographically encrypted user data unit (ENC-NDE) using the cryptographic key ($K_{OEM}$) already present in an encrypted form in the receiver or using the cryptographic key ($K_{OEM}$) decrypted by the first decryption unit.

It is also an object of the invention to provide a transmitter comprising a first encryption unit for the asymmetrical encryption of a cryptographic key ($K_{OEM}$) using a public key ($K_{PUB}$), a second encryption unit for encrypting at least one the user data unit (NDE) using the cryptographic key ($K_{OEM}$) and an interface for providing, i.e., making available the encrypted user data unit (ENC-NDE), the asymmetrically encrypted key (ENC-$K_{OEM}$) and a related key identification ($K_{OEM}$-ID) of the cryptographic key ($K_{OEM}$).

It is also an object of the invention to provide a receiver comprising a testing unit for verifying, with the aid of the received key identification ($K_{OEM}$-ID), whether the transported asymmetrically encrypted key (ENC-$K_{OEM}$) is already present in an encrypted form in the receiver, a first decryption unit for decrypting the received asymmetrically encrypted key (ENC-$K_{OEM}$) using a private key ($K_{PRIV}$) if the verification of the related key identification ($K_{OEM}$-ID) of the cryptographic key ($K_{OEM}$) shows that the received encrypted cryptographic key ($K_{OEM}$) is not yet present in a decrypted form, and a second decryption unit which decrypts the received cryptographically encrypted user data unit (ENC-NDE) using the cryptographic key ($K_{OEM}$) already present in an encrypted form in the receiver or using the cryptographic key ($K_{OEM}$) decrypted by the first decryption unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Possible embodiments of the inventive method of the inventive system will be described hereinafter with reference to the accompanying figures, in which.

DETAILED DESCRIPTION OF THE PREFERRED EMBODIMENTS

Figure 1:
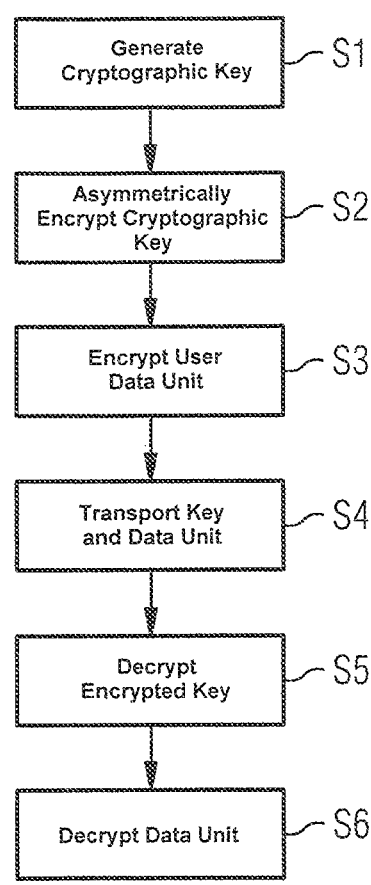
FIG. 1 shows a flow diagram of the method in accordance with an embodiment of the invention.

As may be seen from FIG. 1, an encrypted data transmission comprises a method for the accelerated decryption of cryptographically protected user data NDE according to the invention, wherein the data transmission, occur in six steps S1 to S6, includes the decryption method in accordance with the invention in steps S5, S6.

In a first step S1 a cryptographic key is initially generated. This cryptographic key can in particular be a cryptographic key belonging to a software component manufacturer Original Equipment Manufacturer (OEM). The generated cryptographic key $K_{OEM}$ is provided in step S1 with a related key identification $K_{OEM}$-ID. In one possible embodiment of the transmission, the key identification $K_{OEM}$-ID is formed or calculated by a hash or test value of the respective cryptographic key $K_{OEM}$. In an alternative embodiment, the key identification $K_{OEM}$-ID comprises a generated random number that is generated, for example, by a random number generator of the transmitter. In a further possible embodiment, the key identification $K_{OEM}$-ID is generated by a generated count value of a counter inside the transmitter.

After generation of the cryptographic key $K_{OEM}$ and a related key identification in step S1, the generated cryptographic key $K_{OEM}$ is asymmetrically encrypted in step S2 by the transmitter using a public cryptographic key $K_{pub}$.

In a further step S3, at least one user data unit NDE is encrypted by the transmitter using the generated cryptographic key $K_{OEM}$. In one possible embodiment, the user data unit NDE is a software component SWK or a software element belonging to a software component manufacturer OEM, where the transmitter is part of a development system or a development environment belonging to the software component manufacturer.

In a further step S4, the encrypted user data unit ENC-NDE or the encrypted software component and the asymmetrically encrypted cryptographic key ENC-$K_{OEM}$ and the related key identification ($K_{OEM}$-ID) of the cryptographic key $K_{OEM}$ are transported from the transmitter to a receiver. In one possible embodiment, transportation can occur over a cable or a network. In an alternative embodiment, transportation occurs using a storage device or a data carrier.

The decryption method occurs on the receiving side, where in a step S5 a decryption of the received asymmetrically encrypted key ENC-$K_{OEM}$ is performed using a private key $K_{priv}$, if a verification of the received related key identification $K_{OEM}$-ID of the cryptographic key shows that the cryptographic key $K_{OEM}$ is not yet present in a decrypted state in the receiver.

In a further step S6, the received cryptographically encrypted user data unit ENC-NDE is decrypted using either the cryptographic key $K_{OEM}$ already present in the receiver or using the cryptographic key $K_{OEM}$ decrypted using the private key $K_{priv}$, if the cryptographic key ($K_{OEM}$) is not yet present in the receiver.

If verification in step S5 of the received key identification $K_{OEM}$-ID shows that the related cryptographic key $K_{OEM}$ is not yet present in the receiver, the cryptographic key $K_{OEM}$ decrypted using the private key $K_{priv}$ is stored for further use in the receiver together with its related key identification $K_{OEM}$-ID.

Figure 2:
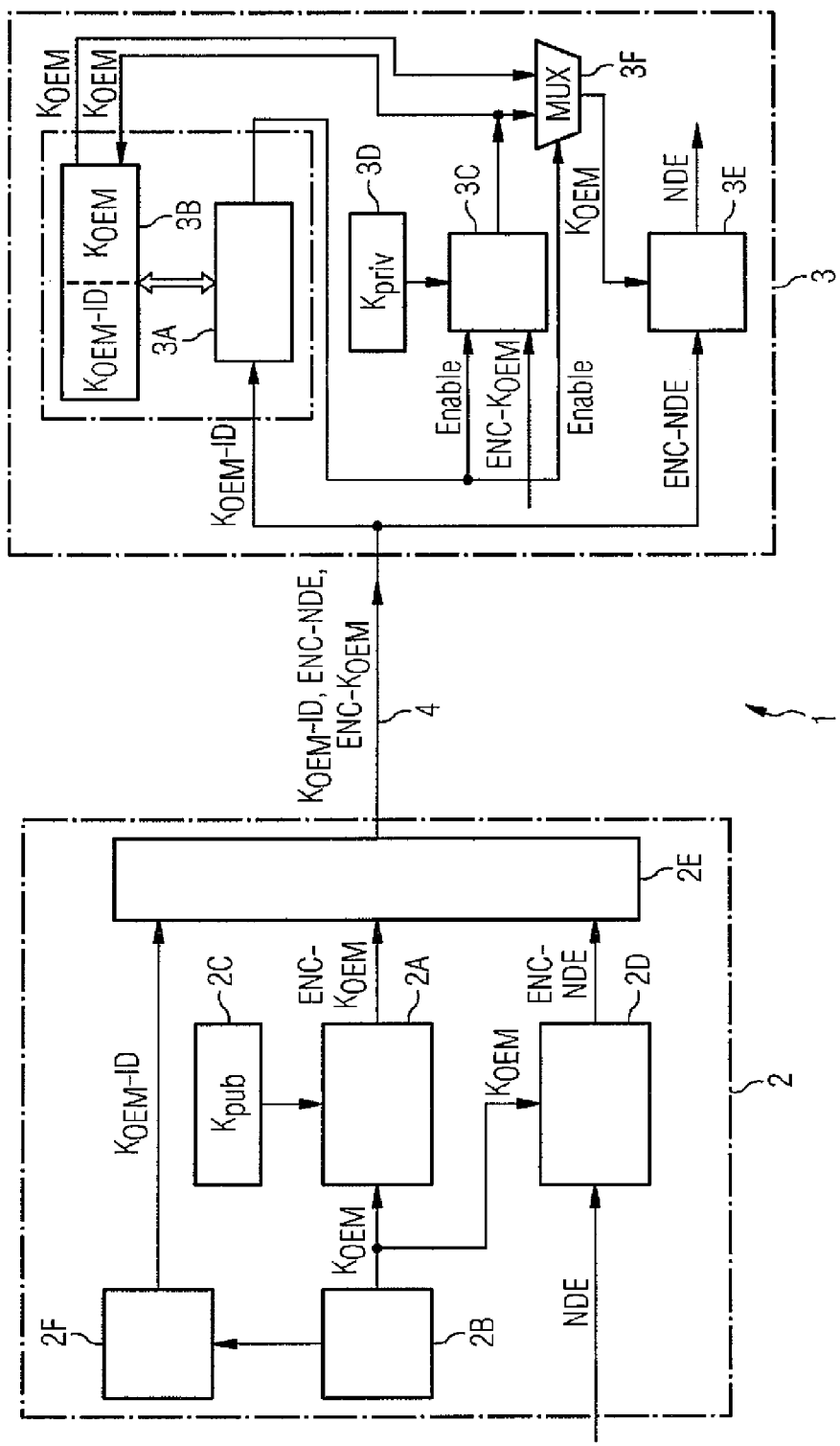
FIG. 2 shows a schematic block diagram of the system in accordance with an embodiment of the invention.

FIG. 2 shows a block diagram of a system 1 in accordance with an embodiment of the invention for the accelerated decryption of cryptographically protected user data units. The system 1 comprises a transmitter 2 and a receiver 3 which are connected together by transportation device 4. In the embodiment shown in FIG. 2, the transportation device 4 is a data cable. In an alternative embodiment, the transportation device is a network or a large number of networks. The network can also be a wireless network. In an alternative embodiment, the transportation device is a memory or a data carrier that transports the data in stored form.

The transmitter 2 comprises a first encryption unit 2A for the asymmetrical encryption of a generated cryptographic key $K_{OEM}$ using a public key $k_{pub}$. The cryptographic key $K_{OEM}$ can be generated, for example, in a key generator 2B belonging to the transmitter 2. In one possible embodiment, the public key $k_{pub}$ can be stored in a register or a memory 2C of the transmitter 2.

The transmitter 2 also includes a second encryption unit 2D for encrypting at least one user data unit NDE using the generated cryptographic key $K_{OEM}$. The user data unit NDE originates in the exemplary embodiment of FIG. 2 from a user data source outside of the transmitter 2. The user data unit NDE can in particular be a software component SWK that is programmed or manufactured by a software component manufacturer OEM by means of a development tool. The user data unit NDE or the programmed software component SWK can be a short executable program or sub-program, for example. The software component comprises a source code or object code of the respective program or sub-program. This source code or object code or this user data unit is encrypted using the generated cryptographic key $K_{OEM}$ by the second encryption unit 2D of the transmitter 2 and made available through an interface 2E of the transmitter 2. The transmitter 2 can be integrated in a development environment of the software component manufacturer OEM. The interface 2E provides the encrypted user data unit ENC-NDE or the encrypted software component, the asymmetrically encrypted key ENC-$K_{OEM}$ and the related key identification $K_{OEM}$-ID of the cryptographic key $K_{OEM}$.

In one possible embodiment, the transmitter 2 comprises a unit 2F for providing a related key identification $K_{OEM}$-ID that is triggered, for example by the key generator 2B when providing the cryptographic key $K_{OEM}$. In one possible embodiment, the unit 2F7 can be a random number generator that generates a random number as a key identification $K_{OEM}$-ID. In an alternative embodiment, the unit 2F is a counter that generates a count value which is provided as the key identification $K_{OEM}$-ID.

The transportation device 4 transports the encrypted user data unit ENC-NDE, the asymmetrically encrypted key ENC-$K_{OEM}$ and the related key identification $K_{OEM}$-ID of the cryptographic key $K_{OEM}$ from the transmitter 2 to the receiver 3. The transportation device can be a data cable, one or more network(s) or a data carrier.

The receiver 3 of the inventive system 1, as is shown in FIG. 2, comprises a testing unit 3A which, with the aid of the received key identification $K_{OEM}$-ID, verifies whether the transported asymmetrically encrypted key ENC-$K_{OEM}$ is already present in an encrypted form in the receiver 3. In one possible embodiment, the testing unit 3A has access for this purpose to an internal memory 3B belonging to the receiver 3, in which a plurality of key identifications $K_{OEM}$-ID and the related cryptographic keys $K_{OEM}$ are stored.

The receiver 3 also comprises a first decryption unit 3C which is provided for the decryption of the received asymmetrically encrypted key ENC-$K_{OEM}$ using a private key $K_{priv}$, if the verification of the related key identification $K_{OEM}$-ID of the cryptographic key $K_{OEM}$ by the testing unit 3A shows that the encrypted received cryptographic key $K_{OEM}$ is not present in decrypted form in the memory 3B of the receiver 3. In one possible embodiment, the first decryption unit 3C receives a corresponding control signal (Enable) from the testing unit 3A over a control signal cable. The private cryptographic key $K_{priv}$ can be stored in a protected memory unit 3D of the memory device 3.

The receiver 3 also comprises a second decryption unit 3E that decrypts the received cryptographically encrypted user data unit ENC-NDE using the cryptographic key $K_{OEM}$ already present in an encrypted form in the receiver or alternatively using the cryptographic key $K_{OEM}$ decrypted by the first decryption unit 3C. In the embodiment shown in FIG. 2, a multiplexer 3F of the receiver 3 is switched as a function of a control signal that originates from the testing unit 3A. If the testing unit 3A shows that the encrypted received cryptographic key $K_{OEM}$ is not yet present in encrypted form, for example, in the memory 3B of the receiver 3, the testing unit 3A activates the first decryption unit 3C for decryption of the received asymmetrical encrypted key using the private key $K_{priv}$ and switches the output of the first decryption unit 3C, which supplies the decrypted cryptographic key $K_{OEM}$, with the multiplexer 3F to the second decryption unit 3E. If, conversely, the testing unit 3A finds that the cryptographic key $K_{OEM}$ is already present in stored form in the receiver 3, decryption using the first decryption unit 3C no longer needs to occur and the existing cryptographic key $K_{OEM}$ already stored is passed to the second decryption unit 3E using the multiplexer 3F. In this case, the relatively complex decryption using the first decryption unit 3C can be omitted, so that the decryption of the cryptographically protected user data unit NDE is accelerated.

In one possible embodiment, the cryptographic key $K_{OEM}$ is formed by a session key belonging to the software component manufacturer OEM. In one possible embodiment, the transmitting user data unit NDE or the transmitted software component SWK is executed at the receiver side by an executing unit or a microprocessor. The receiver 3 can be part of a target system device belonging to a user for the execution of software components SWK or user data units NDE. In another embodiment, the receiver 3 comprises a memory-programmable controller SPS.

In accordance with the invention for the implementation of a hybrid encryption method, a session key used asymmetrically for user data encryption can be provided with key identifications which can be read in plain text.

In an accordance with the disclosed embodiments of the method, a directory of all session keys previously decrypted with the aid of a public key method is preferably set up and updated. This directory can be located, for example, in the memory 3B of the receiver 3. If a new hybrid encrypted data record or a user data unit is received for encryption, it is initially verified whether the directory of the previously decrypted session keys already contains the key identification of the respective session key and if this was used for actual user data encryption of the data record. If the directory does already contain the key identification of the session key, the related session key is read out of the directory and symmetrical decryption of the user data proceeds directly. If the directory does not contain such a key identification, however, or if when decrypting the user data using a session key from the directory it is found that authentication of the encrypted user data is not possible, complete hybrid decryption is performed only in this case. Therefore, with the aid of the public key method the session key, which was used for symmetrical encryption of the user data, is firstly reconstructed and then the user data are symmetrically decrypted with the aid of the calculated session key. The session key calculated in this way is preferably then incorporated in the directory or memory together with its related key identification.

The method in accordance with the disclosed embodiments can be implemented accordingly in the case of a new hybrid encryption of a user data unit NDE if the session key already known is to be used for encryption of the user data unit. In this case, the public key encryption of the session key does not need to be re-calculated. The user data unit is merely symmetrically encrypted.

Marking or identifying hybrid encrypted session keys in accordance with the disclosed embodiments of the method by the encrypting and decryption units makes it possible to recognize whether a specific session key has already been calculated in the past with the aid of a public key calculating operation. If this key is already present in the directory of calculated keys, then renewed execution of the public key operations that reduce performance can be omitted in the disclosed embodiments of the method. In this case the encryption and decryption process is reduced to the symmetrical calculating operations using the pure user data. If certain hybrid encrypted data records or user data units are encrypted or decrypted again and again or are used for a plurality of data records or user data units of the same session key in the disclosed embodiments of the system, the performance or output of the system or computer system can be significantly increased by the disclosed embodiments of the method.

The disclosed embodiments of the method, in which a key identification is used for identifying session keys, can be combined in some embodiments with further methods for protecting against attacks in pre-calculated tables, or to reduce the entropy loss of the secret key material by way of the key identifications that can be read in plain text.

The method and system in accordance with the disclosed embodiments may be used in particular for the secure and confidential transmission of software components or user data units from a development environment 2 to a target system device 3, for example, a memory-programmable controller SPS. In one possible embodiment, the key IDs can also be hash or test values of the actual key data. It is also possible for the key identification or key ID to be generated randomly and independently of the key data.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for accelerated decryption of cryptographically protected user data units, comprising:

(a) generating a cryptographic key and providing the generated cryptographic key with a related key identification which is distinct and separate from the cryptographic key;

(b) asymmetrically encrypting the cryptographic key by a transmitter using a public key;

(c) encrypting at least one data unit using the generated cryptographic key;

(d) transporting the encrypted at least one data unit, the asymmetrically encrypted cryptographic key and the related key identification of the cryptographic key which is distinct and separate from the cryptographic key from the transmitter to a receiver via a transportation means;

(e) verifying, via a microprocessor, a testing unit and memory of the receiver, whether a received related key identification of a cryptographic key which is distinct and separate from the cryptographic key indicates the cryptographic key is present in a decrypted state in the receiver, wherein the verifying comprises reading out of a directory, located in the memory of the receiver, to determine whether the directory contains at least one previously decrypted session key with associated key identification of the respective session key, the respective session key previously decrypted via a public key method as set up or updated for storage in the directory;

(f) switching a multiplexer between selectable inputs as a function of a control signal that originates from the testing unit, wherein upon the testing unit finding the cryptographic key not already present in stored form in the directory of the receiver, the control signal activates a first decryption unit, which is distinct and separate from a second decryption unit, for decryption of the received asymmetrical encrypted key using the private key resulting in selecting for the multiplexer output the first decryption unit decrypted received asymmetrical encrypted key, wherein upon the testing unit finding the cryptographic key already present in stored form in the directory of the receiver, no resulting activation of the first decryption unit for decryption of the received asymmetrical encrypted key using the private key occurs, resulting in selecting for the multiplexer output the cryptographic key already present in stored form in the directory of the receiver, and wherein the multiplexer output of the cryptographic key is passed to the second decryption unit; and (g) decrypting the received cryptographically encrypted at least one user data unit using the multiplexer output cryptographic key.

2. The method as claimed in claim 1, wherein if the verification of the received related key identification which is distinct and separate from the cryptographic key shows that the related cryptographic key is not yet present in the directory of the receiver, the received asymmetrically encrypted cryptographic key decrypted using the private key is stored in the directory of the receiver together with its related key identification which is distinct and separate from the cryptographic key.

3. The method as claimed in claim 2, wherein the user data unit comprises a software component belonging to a software component manufacturer.

4. The method as claimed in claim 1, wherein the user data unit comprises a software component belonging to a software component manufacturer.

5. The method as claimed in claim 4, wherein the cryptographic key comprises a session key belonging to the software component manufacturer.

6. The method as claimed in claim 1, wherein the related key identification which is distinct and separate from the cryptographic key comprises a hash value or test value of the respective cryptographic key.

7. The method as claimed in claim 1, wherein the related key identification which is distinct and separate from the cryptographic key comprises a generated random number of a random number generator of a transmitter.

8. The method as claimed in claim 7, wherein the encrypted user data unit, the related asymmetrically encrypted cryptographic key and the related key identification of the cryptographic key which is distinct and separate from the cryptographic key are one of transported from the transmitter to the receiver over a network and stored on a data carrier.

9. The method as claimed in claim 7, wherein the transmitter comprises a development system belonging to a software component manufacturer for the development of software components.

10. The method claimed in claim 1, wherein the related key identification which is distinct and separate from the cryptographic key comprises a generated count value of a counter of the transmitter.

11. The method as claimed in claim 10 wherein the encrypted user data unit, the related asymmetrically encrypted cryptographic key and the related key identification of the cryptographic key which is distinct and separate from the cryptographic key are one of transported from the transmitter to the receiver over a network and stored on a data carrier.

12. The method as claimed in claim 10, wherein the transmitter comprises a development system belonging to a software component manufacturer for the development of software components.

13. The method as claimed in claim 1, wherein the receiver comprises a target system device belonging to a user for execution of software components.

14. The method as claimed in claim 13, wherein the receiver comprises a memory-programmable controller.

15. A system for accelerated decryption of cryptographically protected user data units, comprising:
(a) a transmitter including:
  a microprocessor;
  memory;
  a first encryption unit which asymmetrically encrypts a cryptographic key using a public key;
  a second encryption unit which encrypts at least one user data unit using the cryptographic key; and
  an interface for making available at least one encrypted user data unit, an asymmetrically encrypted cryptographic key and a related key identification of the cryptographic key which is distinct and separate from the cryptographic key;
(b) a transportation device which transports the encrypted user data unit, the asymmetrically encrypted cryptographic key and the related key identification of the cryptographic key which is distinct and separate from the cryptographic key; and
(c) a receiver comprising:
  a microprocessor;
  a first decryption unit;
  a second decryption unit, wherein the first decryption unit is distinct and separate from a second decryption unit;
  memory storing a plurality of key identifications and related cryptographic keys, wherein the key identifications are distinct and separate from the cryptographic keys;
  a testing unit which verifies, using a received related key identification of the cryptographic key which is distinct and separate from the cryptographic key, whether a received asymmetrically encrypted cryptographic key is already present in an encrypted form in the directory of the receiver, the testing unit accessing the memory to perform a verification,
    wherein the verification comprises reading out of a directory, located in the memory of the receiver, to determine whether the directory contains at least one previously decrypted session key with associated key identification of the respective session key, the respective session key previously decrypted via a public key method as set up or updated for storage in the directory;
    wherein the verifying comprises reading out of a directory, located in the memory of the receiver, to determine whether the directory contains at least one previously decrypted session key with associated key identification of the respective session key, the respective session key previously decrypted via a public key method as set up or updated for storage in the directory;
  a multiplexer that switches between selectable inputs as a function of a control signal that originates from the testing unit,
    wherein upon the testing unit finding the cryptographic key not already present in stored form in the directory of the receiver, the control signal activates the first decryption unit for decryption of the received asymmetrical encrypted key using the private key resulting in selecting for the multiplexer output the first decryption unit decrypted received asymmetrical encrypted key,
    wherein upon the testing unit finding the cryptographic key already present in stored form in the directory of the receiver, no resulting activation of the first decryption unit for decryption of the received asymmetrical encrypted key using the private key occurs, resulting in selecting for the multiplexer output the cryptographic key already present in stored form in the directory of the receiver,
    wherein the multiplexer output of the cryptographic key is passed to the second decryption unit; and
    wherein decrypting the received cryptographically encrypted at least one user data unit using multiplexer output cryptographic key.

16. A receiver for a system for accelerated decryption of cryptographically protected user data units, comprising:
a microprocessor;
a first decryption unit;
a second decryption unit, wherein the first decryption unit is distinct and separate from a second decryption unit;
memory storing a plurality of key identifications and related cryptographic keys, wherein the key identifications are distinct and separate from the cryptographic keys;
a testing unit which verifies, using a received related key identification of the cryptographic key which is distinct and separate from the cryptographic key, whether a received asymmetrically encrypted cryptographic key is already present in an encrypted form in the directory of the receiver, the testing unit accessing the memory to perform a verification,
  wherein the verification comprises reading out of a directory, located in the memory of the receiver, to determine whether the directory contains at least one previously decrypted session key with associated key identification of the respective session key, the respective session key previously decrypted via a public key method as set up or updated for storage in the directory;
  wherein the verifying comprises reading out of a directory, located in the memory of the receiver, to determine whether the directory contains at least one previously decrypted session key with associated key identification of the respective session key, the respective session key previously decrypted via a public key method as set up or updated for storage in the directory;
a multiplexer that switches between selectable inputs as a function of a control signal that originates from the testing unit,
  wherein upon the testing unit finding the cryptographic key not already present in stored form in the directory of the receiver, the control signal activates the first decryption unit for decryption of the received asymmetrical encrypted key using the private key resulting in selecting for the multiplexer output the first decryption unit decrypted received asymmetrical encrypted key,
  wherein upon the testing unit finding the cryptographic key already present in stored form in the directory of the receiver, no resulting activation of the first decryption unit for decryption of the received asymmetrical encrypted key using the private key occurs, resulting in selecting for the multiplexer output the cryptographic key already present in stored form in the directory of the receiver,
  wherein the multiplexer output of the cryptographic key is passed to the second decryption unit; and
  wherein decrypting the received cryptographically encrypted at least one user data unit in an accelerated manner using multiplexer output cryptographic key.

* * * * *